(12) United States Patent
Hiben et al.

(10) Patent No.: US 8,477,892 B2
(45) Date of Patent: Jul. 2, 2013

(54) METHOD AND APPARATUS FOR MITIGATION OF INTERFERENCE

(75) Inventors: Bradley M. Hiben, Glen Ellyn, IL (US); Kevin G. Doberstein, Elmhurst, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 945 days.

(21) Appl. No.: 12/570,131

(22) Filed: Sep. 30, 2009

(65) Prior Publication Data
US 2011/0075771 A1 Mar. 31, 2011

(51) Int. Cl.
*H04B 1/10* (2006.01)
(52) U.S. Cl.
USPC ........... 375/349; 375/344; 375/147; 375/233; 375/316; 375/130; 370/319; 370/320; 370/330
(58) Field of Classification Search
USPC .......................................................... 375/344
See application file for complete search history.

(56) References Cited

U.S. PATENT DOCUMENTS

| | | | |
|---|---|---|---|
| 3,587,097 A | | 6/1971 | Stull |
| 4,388,723 A | | 6/1983 | Keen |
| 4,912,726 A | * | 3/1990 | Iwamatsu et al. ............. 375/294 |
| 5,465,410 A | | 11/1995 | Hiben |
| 5,812,523 A | * | 9/1998 | Isaksson et al. ............. 370/208 |
| 6,894,630 B1 | * | 5/2005 | Massie et al. ................. 341/118 |
| 7,463,672 B2 | * | 12/2008 | Monsen ........................ 375/147 |
| 2005/0238124 A1 | | 10/2005 | Becker et al. |
| 2006/0146926 A1 | * | 7/2006 | Bhoja et al. ................... 375/233 |
| 2007/0110201 A1 | | 5/2007 | Mergen et al. |
| 2007/0189362 A1 | * | 8/2007 | D'Amico et al. ............. 375/148 |
| 2011/0075774 A1 | | 3/2011 | Hiben et al. |

FOREIGN PATENT DOCUMENTS

| | | |
|---|---|---|
| EP | 1786111 A1 | 5/2007 |
| EP | 1956719 A2 | 8/2008 |
| WO | 2006/055791 A1 | 5/2006 |

OTHER PUBLICATIONS

International Preliminary Report on Patentability and Written Opinion for counterpart International Application No. PCT/US2010/047221 mailed on Apr. 12, 2012.
PCT International Search Report dated Nov. 19, 2010.
Office Action dated Nov. 8, 2012 for U.S. Appl. No. 12/570,115.

* cited by examiner

*Primary Examiner* — Lihong Yu
(74) *Attorney, Agent, or Firm* — Anthony P. Curtis; Daniel R. Bestor (57) ABSTRACT

A method of reducing error in transmissions received in a receiver is provided. A transmission containing a synchronization signal is inputted through a first filter to a synchronization correlator, to generate a timing error of the synchronization signal. An amount of delay of the synchronization signal sufficient to reduce the timing error is determined. The transmission is delayed by the amount of delay by being passed through at least a second, variable filter whose delay is determined using a stochastic gradient algorithm. The synchronization correlator may also generate a deviation error of the synchronization signal and determine an amount of deviation correction sufficient to reduce the deviation error as well as generating a frequency error of the synchronization signal and determining an amount of frequency correction sufficient to reduce the frequency error.

5 Claims, 5 Drawing Sheets

METHOD AND APPARATUS FOR MITIGATION OF INTERFERENCE

RELATED APPLICATION

The present application is related to the following U.S. application commonly owned together with application Ser. No. 12/570,115, filed by Motorola, Inc. on the same day as the instant application, and entitled "Method and Apparatus For Mitigation of Interference" by Hiben et al.

TECHNICAL FIELD

This present invention relates generally to the field of communication receivers, including communication receivers having filters for reducing adjacent channel interference.

BACKGROUND

Communication receivers are used to receive desired carrier signals in narrow frequency bands. Such receivers typically include a static filter that filters out all but a predetermined band of desired frequencies. Automatic Frequency Control (AFC) systems are known, which improve sensitivity in radios having modest frequency stability performance. In AFC systems, the output of a receiver discriminator is low pass filtered at a very low frequency. The output of the filter is then driven to zero volts by adjusting the frequency of a local oscillator. An advantage of this system is that there is no ambiguity about which way to adjust the frequency of the local oscillator to compensate for the frequency offset and interference. In these systems, the low pass filtered discriminator output is proportional, in both magnitude and sign, to the local oscillator adjustment required.

AFC systems operate under the assumption that there is negligible low frequency content in the desired signal. The AFC systems also operate with the assumption that centering the signal maximizes the signal-to-noise ratio. These assumptions work well for 25 kHz and 30 kHz channel land-mobile radio systems where adjacent channel interference is negligible. In these systems, adjacent channel interference protection levels of 80 dB or more are common.

Increasingly, however, land mobile radio users are requiring spectrally efficient high-speed digital systems. In response, one standards setting body has standardized a 9.6 kbps, 12.5 kHz channel system and is developing a 12 kbps, two-slot TDMA 12.5 kHz channel system standard. Further, the Federal Communications Commission is splitting 25 kHz and 30 kHz channels into 12.5 kHz channels. As this narrow-banding occurs, it reduces the adjacent channel interference protection levels by 20 dB or more. Thus, in these 12.5 kHz channel systems, substantial adjacent channel interference is present. This interference is expected to degrade coverage in some frequency bands and geographical areas, as compared to what is currently available.

As a result of the increase in adjacent channel interference present when narrow-banding, the approach of minimizing frequency offset is not necessarily the most beneficial. In fact, in some interference cases it is better to adjust the receiver away from the desired signal. In these cases, the sensitivity degradation is minimized at a frequency in the opposite direction from the desired transmission.

In U.S. Pat. No. 5,465,410, Method and Apparatus for Automatic Frequency and Bandwidth Control, a quality metric was generated based on the output of each intermediate frequency (IF) filter in a multi-IF filter receiver and the output from the IF filter with the best quality metric was selected as the output from the receiver. This can improve simulcast performance. The patent suggested that decision error, which is the square of the symbol error, would be the preferred approach for determining the quality metric for a digital signal. Further, the patent suggested that the filter that minimized the decision error should be chosen. Unfortunately, it is impossible to effectively mitigate simulcast distortion as well as adjacent channel interference with this configuration, because it is necessary to react quickly to the changes in the level of symbol error because simulcast distortion is related to the phase relationship of the simulcast carriers. So, a new method of selecting the best IF in the presence of both adjacent channel interference and simulcast interference is needed.

SUMMARY

In a first aspect, a method of reducing error in transmissions received in a communication receiver, the communication receiver configured to receive transmissions at a frequency f1, the method comprising inputting a transmission containing a synchronization signal to a synchronization correlator to generate a timing error of the synchronization signal; determining a symbol error of symbols encoded by the synchronization signal; optionally generating a deviation error of the synchronization signal with the synchronization correlator; optionally generating a frequency error of the synchronization signal with the synchronization correlator; determining an amount of delay of the synchronization signal sufficient to reduce the timing error, optionally the deviation error, optionally the frequency error, and optionally the symbol error; and delaying a signal not containing the synchronization signal by the amount of delay.

In a second aspect, a method of reducing error in signals received by a communication receiver, comprising generating a first recovered signal and an associated symbol error from a first signal received by the communication receiver; determining a first amount of delay of the first signal sufficient to reduce the associated symbol error; and delaying a second signal by the first amount of delay.

In a third aspect, a communication receiver configured to receive a signal, comprising a plurality of primary filters, an antenna operably coupled to an input for each of the plurality of primary filters, a plurality of signal decoders operably coupled to receive a filtered signal from at least a corresponding primary filter, at least one variable delay filter operably coupled to an input for each of the plurality of signal decoders for delaying the filtered signal received by each of the plurality of signal decoders, a synchronization correlator operably coupled to receive a filtered signal from at least one primary filter, and a stochastic gradient algorithm operably coupled to the output of the synchronization correlator and operably coupled to each variable delay filter for driving a delay in each variable delay filter.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted to facilitate viewing clarity. It will further be appreciated that certain actions and/or steps may be described or depicted in a particular order of occurrence while those skilled in the art will understand that such specificity with respect to sequence is not actually required.

DETAILED DESCRIPTION

Generally, a method and apparatus is provided for recovering a desired signal by reducing the effect of adjacent channel interference and mitigation of simulcast distortion, within a communication receiver. This is accomplished by equipping the communication receiver with a plurality of intermediate frequency (IF) filtering elements having varying and adjustable center frequency, and optionally bandwidth, characteristics. Each of these IF filtering elements receives at least part of the desired signal. The IF filter with the best quality metric is not necessarily selected. Instead, a combination of short term and long term metrics are used, principally to detect adjacent channel interference while still allowing mitigation of simulcast distortion.

Simulcast distortion is related to the carrier phase as well as the amplitude and delay of the various simulcast signals. Increasing IF filter bandwidth improves simulcast performance. However, increasing the IF filter bandwidth also degrades adjacent channel interference performance. The best IF filter is determined and used when both simulcast and adjacent channel interference are considered.

The carrier phase relationship changes constantly due to the movement by the mobile or portable receiver as well as movement of objects nearby the receiver, even if the receiver itself is stationary. This variation is due to Rayleigh fading when only reflected paths exist, or to Doppler shifting when line-of-site paths exist. In either case, the carrier phase relationship will vary at the Doppler rate. Thus, the filtering element selection must take place at the Doppler rate and the quality metric must respond to the highest likely Doppler rate, which is approximately 180 Hz for typical land-mobile receivers operating in the 150-900 MHz frequency band and at speeds of 0-70 MPH.

In U.S. Pat. No. 5,465,410, the decision error was determined and sent directly to the multiplexer, which selected the symbol based on the lowest valued quality metric, preferably, the decision error. Unfortunately, despite the fact that reacting quickly to changes in the symbol error level is desirable to reduce the simulcast distortion, for the reasons given previously, adjacent channel interference is noise-like and it is necessary to average over a longer time to avoid choosing the wrong filter.

As noted above, the primary signal quality metric is the decision error values filtered by a low-pass filter (LP Filter C in FIG. 1), preferably 180 Hz in bandwidth. The decision error values are also passed through another low-pass filter, preferably 5 Hz in bandwidth (LP Filter D in FIG. 1). The outputs of low-pass filter D are then tested to see if they are below a given threshold, the threshold preferably being 0.15 kHz-squared of decision error. If a low-pass filter D produces a decision error less than or equal to this value, the output of the associated IF filter will be selected if the output from the associated low-pass filter C is the lowest value of the other low-pass filter Cs. If the output of a low-pass filter D is greater than the threshold, then it is also tested to see if it is greater than the decision error output by another low-pass filter D. If it is, then the output of the associated IF filter cannot be selected even if the value from its associated low-pass filter C is the lowest of all the low-pass filter Cs. Thus, a particular filter may not be selected even though it might have the best quality metric at a given instant.

Figure 1:
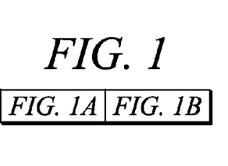
FIG. 1 is a simplified block diagram of a communication receiver, split into FIGS. 1A and 1B, in accordance with one embodiment.
Figure 1A:
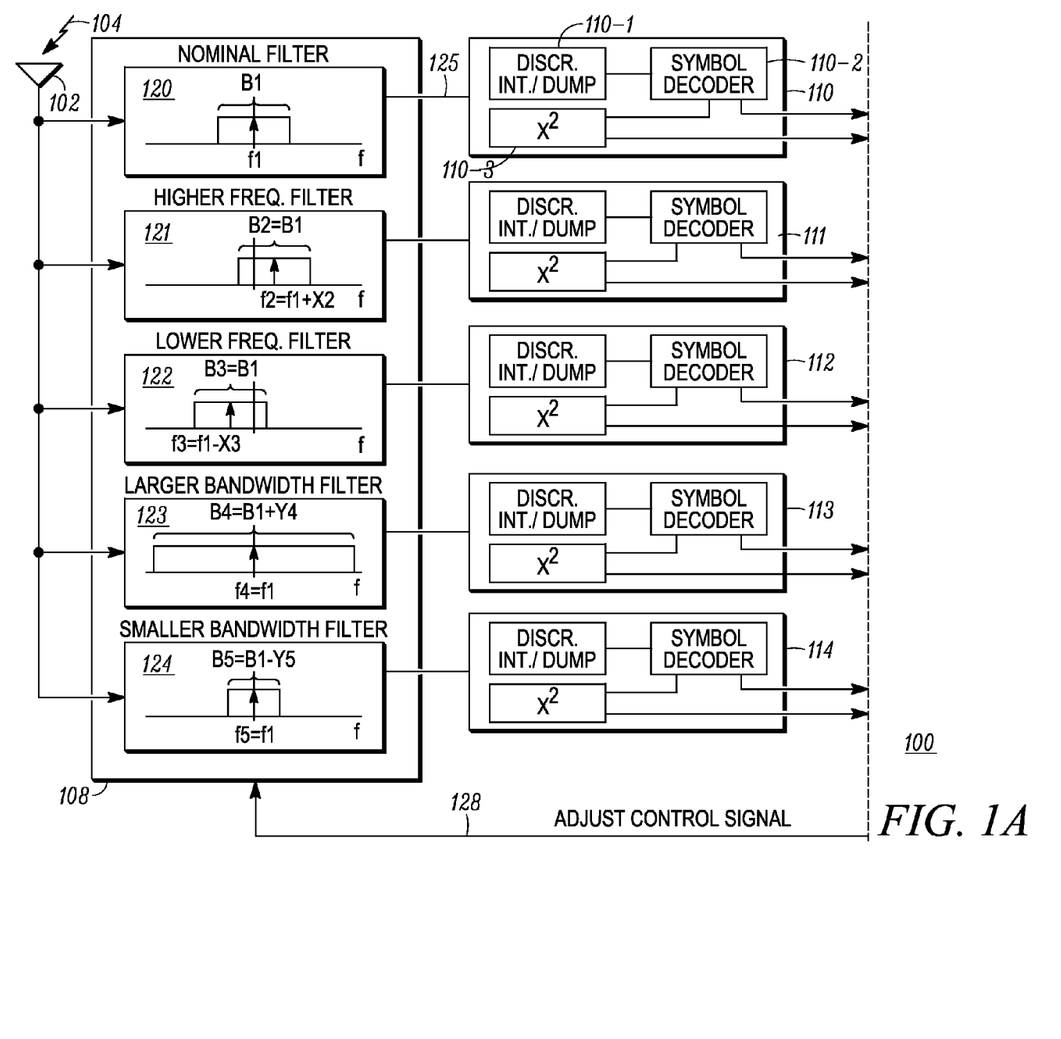
Figure 1B:
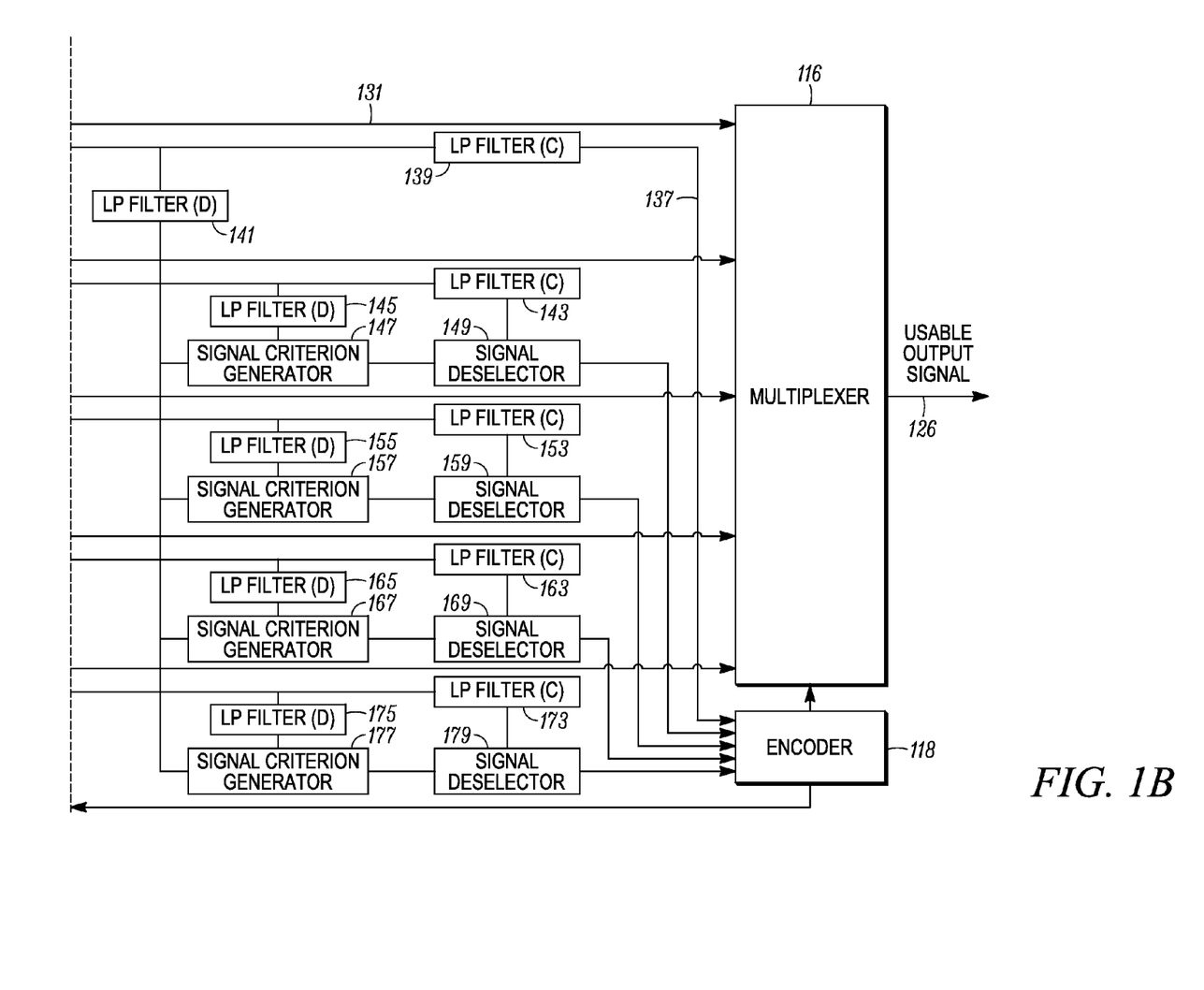
Figure 3:
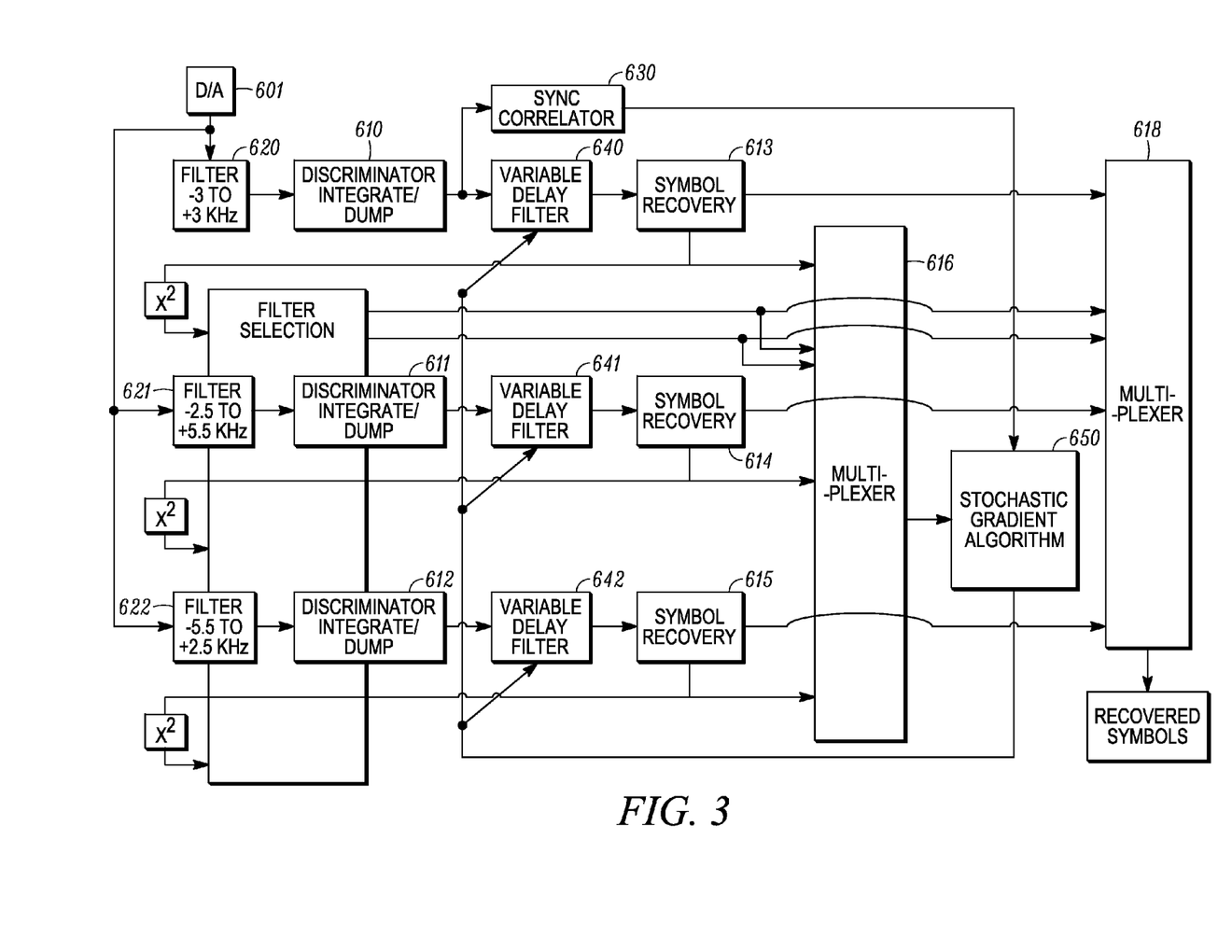
FIG. 3 is a simplified block diagram of a communication receiver, emphasizing elements involved in synchronization, in accordance with one embodiment.

Referring to FIGS. 1-4. FIG. 1 illustrates a communication receiver (100) having an antenna (102) which receives a desired signal (104). The communication receiver (100) includes a filter bank of IF filters (108) and a plurality of signal recoverers (110-114) shown in FIG. 1A, and other modules including a multiplexer (116) and an encoder (118) shown in FIG. 1B. Also present in FIG. 1B are low-pass filters C (139, 143, 153, 163 and 173), low-pass filters D (141, 145, 155, 165 and 175), signal criterion generators (147, 157, 167 and 177), and signal deselectors (149, 159, 169 and 179). Of the elements shown in FIGS. 1, 123, 124, 113 and 114, as well as 163, 165, 167, 169, 173, 175, 177 and 179, are optional and need not be present in the device. Additional elements of the device, related to synchronization, not illustrated in FIG. 1, are illustrated in FIG. 3.

The signal recoverers (110-114) each contain a discriminator/integrate-and-dump filter, a symbol decoder and a squaring function. As an example, a signal recoverer (110) receives an output (125) from an IF filter (120). The signal is sent through a discriminator/integrate-and-dump filter (110-1) and then a symbol decoder (110-2) decodes the output of the filter and sends this recovered symbol (131) to the multiplexer (116). The symbol decoder (110-2) synchronizes to the symbol stream and decides what symbol was sent based on the voltage at the output of the discriminator/integrate-and-dump filter (110-1) at the symbol center. In addition, the symbol decoder (110-2) generates the symbol error which is used to maintain synchronization. The symbol error is the difference between the received signal voltage at the output of the integrate/dump filter (110-1) and the closest ideal symbol value when measured at the symbol center. The symbol decoder (110-2) also sends the symbol error to the squaring function (110-3), which generates the decision error.

The decision error is sent through LP filter C (for example, 139) to generate a signal quality metric (137). The squaring function (110-3) also sends the decision error through LP filter D (for example, 141) to all the signal criterion generators when the LP filter D is associated with the first IF filter 120, or only to the signal criterion generator associated with the corresponding IF filter (for example, in the case of LP filter D 145, only to signal criterion generator 147). Deselection is carried out by the signal deselector (for example 149), by virtue of a signal from the signal criterion generator.

A signal quality metric (137) which has not been deselected is sent to the encoder (118). The encoder (118) identifies a favorably recovered signal (e.g., the one having the highest signal quality metric), and advises the multiplexer (116) as to which recovered signal has been identified. The multiplexer (116) then forms a usable output signal (126) based on the identified, recovered signal. The encoder (118) also generates an adjust control signal (128) that is used by the filter bank of IF filters (108) to provide adjustments to the filtering elements, as later described.

The filter bank (108) comprises a plurality of filtering elements. In an embodiment, the filter bank comprises five intermediate frequency (IF) filters (120-124), the last two filters being optional, of various bandwidths and frequency offsets, as shown. It is well understood that the filtering elements might also be implemented using a digital signal processor (DSP) proceeded by an analog-to-digital converter (shown in FIG. 3 as 601). In a preferred embodiment, one filter has a nominal bandwidth and a nominal frequency offset, for example, the nominal filter employs a single fixed frequency offset and bandwidth that is employed in a typical receiver. The other four filters have frequency offsets either above or below the nominal frequency offset and/or bandwidths either larger or smaller than the nominal bandwidth. This variety of filters increases the probability of recovering a signal of optimal quality during a communication. In an alternate embodiment, a varying number of filtering elements (e.g., three filters including a nominal filter, a higher frequency filter, and a lower frequency filter, or a nominal filter, a larger bandwidth filter, and a smaller bandwidth filter) may be used. The filter bank of IF filters (108) may be adjusted similarly to adjustment of the filter bank described in U.S. Pat. No. 5,465,410, during operation.

Figure 2:
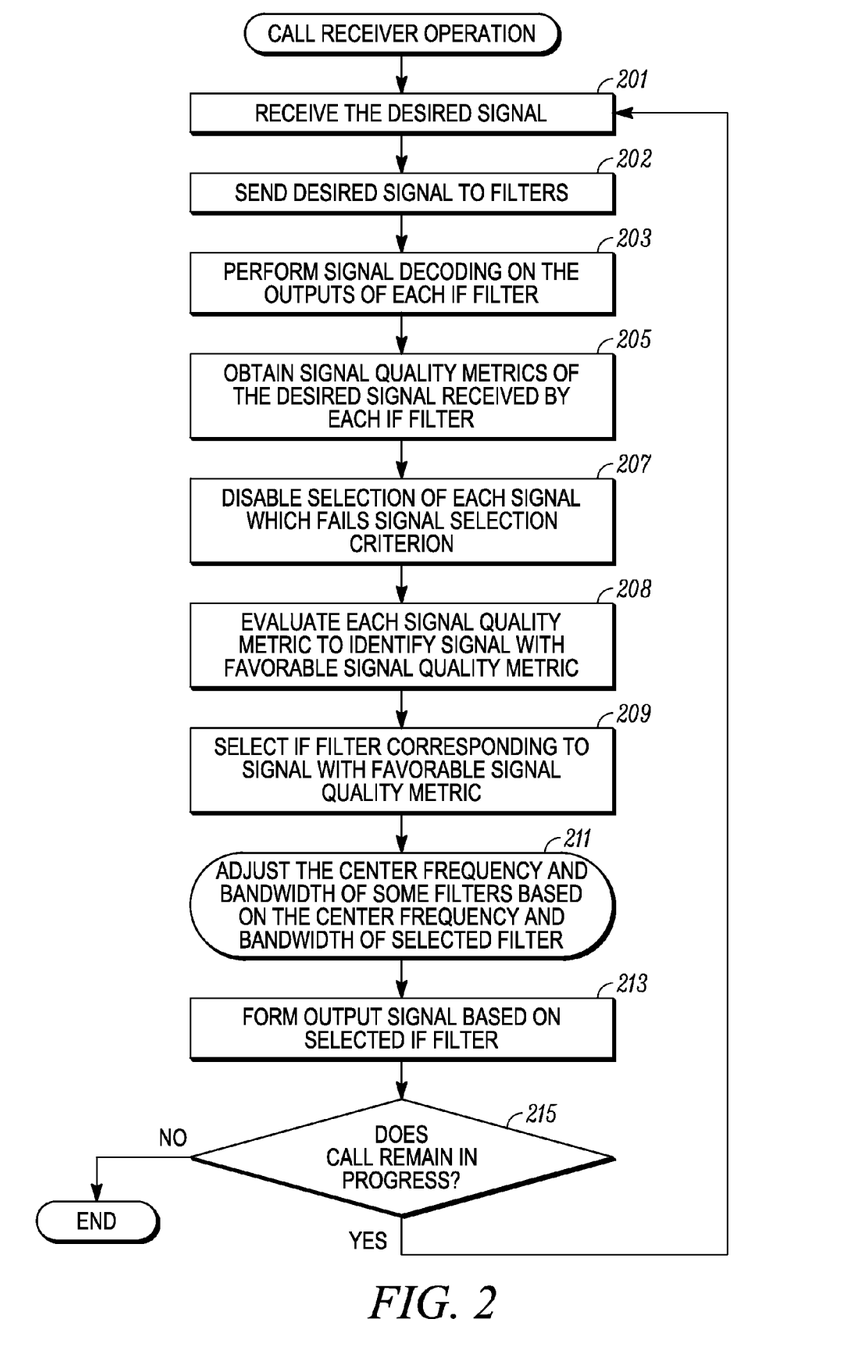
FIG. 2 is a flowchart depicting operation of a call receiver, in accordance with one embodiment.

FIG. 2 illustrates one embodiment of a flow chart depicting the operation of a communication call receiver. Upon receiving (201) the desired signal, the signal is sent (202) to each of the IF filters. Signal decoding is performed (203) on the outputs of each of the IF filters. As is known, in a digital system, the signal recovery might comprise FM discriminators, filters (such as filters matched to the digital pulse shape), and data level slicers. These components recover binary or multi-level digital data representing the desired signal.

Upon performing signal decoding, the signal quality of each of the recovered signals is obtained (205) from the desired signal received by each IF filter, as described above. Deselection, by disabling selection of each signal that fails the signal selection criterion, is then carried out (207). The encoder evaluates (208) each signal that has not been deselected, to identify the signal having the best signal quality metric. In a digital system, the difference between the actual and expected recovered signal levels is an error measurement, for example the error between the actual and expected value. Therefore, a lower value indicates a higher quality level.

The multiplexer then selects (209) the IF filter corresponding to the signal with the favorable signal quality metric. In a digital system, for example, the multiplexer selects the filter that produces the minimum value. The center frequencies and bandwidths of some of the filters are adjusted (211), as later described, to maximize the signal quality of the desired signal.

The multiplexer then forms (213) an output signal by selecting the output of the IF filter having the favorable signal quality metric. The outputted signal is then used in the same manner as a prior art receiver might use the recovered signal, for example sent to a transcoder for audio generation.

Next, it is determined (215) whether the present call remains in progress. Digital systems, such as an APCO Project 25 system, detect a communication termination by call terminator words, the loss of a number of consecutive frame synchronization words or the loss of an RF carrier. Once communication termination is detected, the recovered signal quality process and filter updating processes cease. At this point, the filtering elements might be reset to initial conditions, unless there is a countervailing interest in not doing so.

In one embodiment, only three IF filters may be used: one filter is 6 kHz in bandwidth and centered at the channel center, and the other two filters are 8 kHz in bandwidth with one centered at −1.5 kHz from the channel center and the other is centered at +1.5 kHz from the channel center. From a signal processing point of view, it is expensive to operate multiple IF filters in a receiver, so the following algorithm may be used to derive two 8 kHz filters from a single 8 kHz filter that is centered at the channel center. The centered filter is symmetrical around the channel center and thus can be represented by real coefficients. In general, the offset filters are constructed by multiplying the centered filter by a complex exponential sequence given by:

$$\text{Offset\_Filter\_Tap}(m)^+ = \text{Centered\_Filter\_Tap}(m) \times e^{\frac{j2\pi m F_{offset}}{F_s}}$$

where $F_{offset} = +1.5$ kHz for the positive offset filter, the sample rate $F_s$ is given in kHz and $m = \{0, 1, \ldots, M-1\}$ where M is the number of taps in the filter, and:

$$\text{Offset\_Filter\_Tap}(m)^- = \text{Centered\_Filter\_Tap}(m) \times e^{\frac{-j2\pi m F_{offset}}{F_s}}$$

with $F_{offset} = -1.5$ kHz for the negative offset filter. Applying Euler's formula to the above results in:

$$\text{Offset\_Filter\_Tap}(m)^+ = \text{Centered\_Filter\_Tap}(m) \times \left[\cos\left(\frac{2\pi m F_{offset}}{F_s}\right) + j\sin\left(\frac{2\pi m F_{offset}}{F_s}\right)\right]$$

$$\text{Offset\_Filter\_Tap}(m)^- = \text{Centered\_Filter\_Tap}(m) \times \left[\cos\left(\frac{2\pi m F_{offset}}{F_s}\right) - j\sin\left(\frac{2\pi m F_{offset}}{F_s}\right)\right]$$

This shows that the only difference between the two filters is the sign of the imaginary part of the coefficient values. The outputs of the filters are given by:

$$\text{Filter\_Output}(n)^+ = \sum_{m=0}^{M-1} \text{Offset\_Filter\_Tap}(m)^+ \times \text{IQ\_Sample}(n-m)$$

$$\text{Filter\_Output}(n)^- = \sum_{m=0}^{M-1} \text{Offset\_Filter\_Tap}(m)^- \times \text{IQ\_Sample}(n-m)$$

where both the filter taps and IQ samples are complex and n is the index of the channel samples. Complex operations in a DSP consist of four real multiply/accumulate (MAC) operations per filter tap using two real accumulators, one accumulator for the real part and one for the imaginary part. Running two complex filters would therefore take 2*M*4=8*M MAC operations. In the efficient algorithm described here, this function is implemented using four accumulators as follows to accumulate the following real sums:

$$RR(n) = \sum_{m=0}^{M-1} \text{Re}[\text{Offset\_Filter\_Tap}(m)^+] \times \text{Re}[\text{IQ\_Sample}(n-m)]$$

$$RI(n) = \sum_{m=0}^{M-1} \text{Re}[\text{Offset\_Filter\_Tap}(m)^+] \times \text{Im}[\text{IQ\_Sample}(n-m)]$$

$$IR(n) = \sum_{m=0}^{M-1} \text{Im}[\text{Offset\_Filter\_Tap}(m)^+] \times \text{Re}[\text{IQ\_Sample}(n-m)]$$

-continued $$II(n) = \sum_{m=0}^{M-1} \text{Im}[\text{Offset\_Filter\_Tap}(m)^+] \times \text{Im}[\text{IQ\_Sample}(n-m)]$$

and negating and summing as follows to obtain the outputs from both filters without additional MAC operations:

Filter_Output$(n)^+$=$(RR(n)-II(n))+j(IR(n)+RI(n))$

Filter_Output$(n)^-$=$(RR(n)+II(n))+j(-IR(n)+RI(n))$

This is possible because the only difference between the filters is a negation of the imaginary part of the coefficient values which, since multiplication is distributive across addition, can be performed by negating the sums involving the imaginary coefficient values (II(n) and IR(n)) at the last step.

Thus, rather than taking 8M operations to obtain the outputs from the two filters, only 4M+4 operations are used. For a typical filter length of 24 taps, the efficient algorithm uses 100 operations rather than 196 operations, nearly a savings of 50%. For smaller filters the savings is less but for larger filters the savings approaches 50%. Note that this algorithm does not affect the 6 kHz filter used in the multi-IF receiver.

FIG. 3 is a simplified block diagram of a communication receiver, emphasizing elements involved in synchronization. Elements described in FIG. 1, involved in filter selection, are only illustrated as a block in FIG. 3.

FIG. 3 illustrates a communication receiver similar to that of FIG. 1, where the signal from the antenna is passed through a digital-to-analog converter (601). Also illustrated are IF filters (620-622), discriminator/integrate-and-dump filters (610-612), symbol decoders (613-615), and a multiplexer (618), each of which was previously described in FIG. 1. Additional elements shown in FIG. 3, which were not shown in FIG. 1, included synchronization correlator (630), variable delay filters (640-642), a second multiplexer (616) and a stochastic gradient algorithm (650). The synchronization correlator (630) uses the synchronization signal (typically a fixed length known set of symbols signal sent periodically during every transmission) to determine timing error (the error between the true and expected symbol centers of the data signal). Optionally, the synchronization correlator may also determine the deviation error (the error between the true and expected deviation for each symbol), and/or the carrier frequency error (the error between the frequency of the transmitted signal and the frequency that the receiver is tuned to) from the synchronization signal. This information in then passed to the stochastic gradient algorithm (650). The wave form of the signal may also be passed to the stochastic gradient algorithm (650). Finally, the symbol error, generated by the symbol decoder (one of 613-615) of the selected IF filter (one of 620-622), the selection being carried by the second multiplexer (616), may also be passed to the stochastic gradient algorithm (650).

The stochastic gradient algorithm (650) is a well know process for timing recovery in digital systems (see, for example, "Digital Communication: Third Edition" by John R. Barry, David G. Messerschmitt and Edward A. Lee, Springer, 2003). The stochastic gradient algorithm extracts the waveform slope at the symbol center, and uses this information, together with the symbol error, to drive the delay in the variable delay filters to minimize the symbol timing error. This is valid as the timing on all three IF filter branches of the receiver are identical and advantageous because it provides the timing estimation updates based on the path with the lowest error.

In an alternative embodiment, the three variable delay filters (640-642) may be replaced by a single variable delay filter placed between the output of the digital-to-analog converter (601) and in front of where the signal is split three ways as it is directed to the three IF filters. In another alternative embodiment, variable gain amplifiers may also be place between the discriminator/integrate-and-dump filters (610-612) and the symbol decoders (613-615); the stochastic gradient algorithm (650) may then drive gain or attenuation of the signal, based on the deviation error, to further minimize the symbol error.

Figure 4:
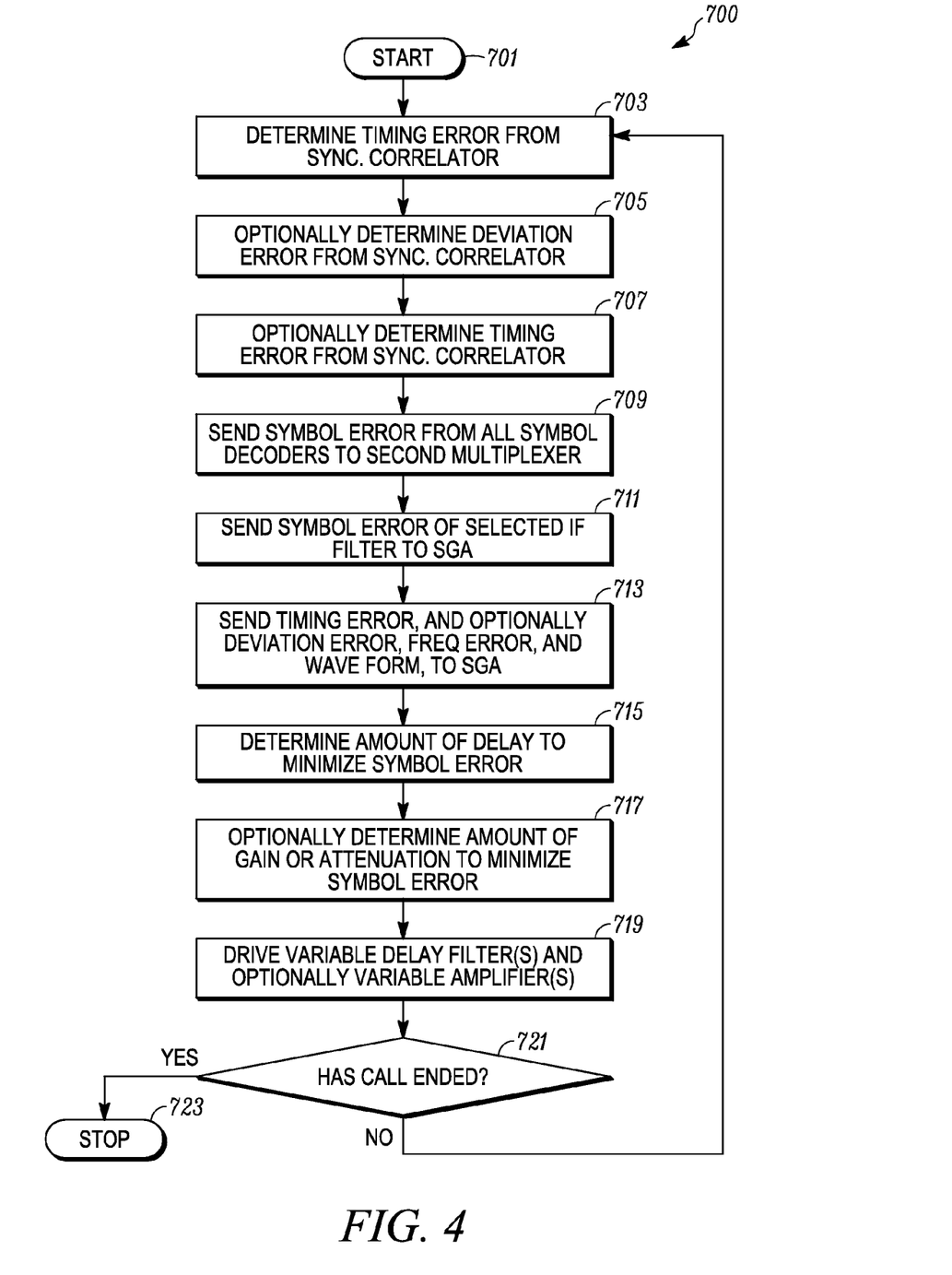
FIG. 4 is a flowchart depicting operation of call receiver for synchronization, in accordance with one embodiment.

FIG. 4 is a flowchart depicting operation of a call receiver for synchronization, 700. The operation begins at the start of a call or receipt of a transmission, 701. The synchronization correlator then determines the timing error at 703. Optionally, the synchronization correlator may determine the deviation error at 705, and/or the frequency error at 707. These three steps may be carried out in any order.

Separately, the symbol error is sent from the symbol decoders to the second multiplexer at 709, followed by the multiplexer sending the symbol error of the selected IF filter to the stochastic gradient algorithm (SGA) at 711. Separately, the timing error is sent to the SGA at 713. Optionally, first order control loops are used to correct for deviation and/or frequency errors, which are also driven by the symbol error. Also at 713, the waveform may be sent to the SGA.

Based on all the different error information received, the SGA then determines the amount of delay needed to minimize the symbol error, at 715. As part of this determination, the SGA extracts the wave form slope at the symbol center, and uses this information to determine the amount of delay needed to minimize the symbol error, also at 715.

Finally, the operation determines if the call or transmission has ended, at 721. If the call or transmission has ended, then the operation stops, at 723. Otherwise, the operation returns to determining the frequency error, at 703.

The present application includes flowcharts and other illustrations of methods, apparatus (systems) and computer program products, in accordance with embodiments of the present disclosure. It will be understood that each block of the flowcharts and other illustrations may be implemented by computer program instructions or by appropriately configured hardware. The computer program instructions may be loaded onto a computer or other programmable data processing apparatus to produce a machine, such that the instructions which execute on the computer or other programmable data processing apparatus may create means for implementing the functions specified in the flowchart block or blocks. These computer program instructions may also be stored in a storage device that may direct a computer or other programmable data processing apparatus to function in a particular manner, such that the instructions stored in the storage device produce an article of manufacture including instruction means which may implement the function specified in the flowchart and/or other illustrations. The computer program instructions may also be loaded onto a computer or other programmable data processing apparatus to cause a series of operational steps to be performed on the computer or other programmable data processing apparatus to produce a computer implemented process such that the instructions which execute on the computer or other programmable apparatus may provide steps for implementing the functions specified in the flowchart block or blocks. Therefore, the flowcharts and illustrations support combinations of means for performing the specified functions, combinations of steps for performing the specified functions and program instruction means for performing the specified functions. Each block of the flowcharts and illustrations, and combinations of blocks in the flowcharts and illustrations, may be implemented by special purpose hardware-based computer systems which may perform the specified functions or steps, or combinations of special purpose hardware and computer instructions.

Certain portions of this application, such as the Abstract and Summary, are provided to allow the reader to quickly ascertain the nature of the disclosure. They are submitted with the understanding that they will not be used to interpret or limit the scope or meaning of the claims. In addition, in the Detailed Description, various features may be grouped together for the purpose of streamlining the disclosure. This method of disclosure is not to be interpreted as reflecting an intention that the embodiments require more features than are expressly recited in each claim. Rather, as the following claims reflect, inventive subject matter lies in less than all features of a single disclosed embodiment. Thus, the claims are hereby incorporated into the Detailed Description, with each claim standing on its own as a separately claimed subject matter.

Those skilled in the art will recognize that a wide variety of modifications, alterations, and combinations can be made with respect to the above described embodiments without departing from the spirit and scope of the invention defined by the claims, and that such modifications, alterations, and combinations are to be viewed as being within the scope of the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by any claims issuing from this application and all equivalents of those issued claims.

What is claimed is:

1. A communication receiver configured to receive a signal and provide improved synchronization, the receiver comprising:
   a plurality of primary filters, wherein the plurality of primary filters comprise a nominal primary filter and one or more additional primary filters each having a different combination of center frequency and bandwidth compared to the nominal primary filter,
   an antenna, operably coupled to an input of each of the plurality of primary filters,
   a plurality of signal decoders, each operably coupled to receive a filtered signal from a corresponding primary filter and output a corresponding recovered symbol signal and symbol error signal,
   a plurality of variable delay filters, each operably coupled between a primary filter and corresponding signal decoder, for delaying the corresponding filtered signal received by each of the plurality of signal decoders by a configured delay,
   a synchronization correlator, operably coupled to receive a filtered signal from at least one primary filter and output one of a timing, deviation, and frequency error signal,
   a multiplexer configured to output a selected lowest symbol error signal from among the plurality of symbol error signals output by the signal decoders, and
   a stochastic gradient algorithm processor, operably coupled to the output of the synchronization correlator and the output of the multiplexer, and operably coupled to an input of each of the plurality of variable delay filters, for setting a same delay at each variable delay filter as a function of (i) the one of the timing, deviation and frequency error signal and (ii) the selected lowest symbol error signal.

2. The communication receiver of claim 1, wherein the synchronization correlator is configured to determine a timing error of a synchronization signal and output the timing error signal.

3. The communication receiver of claim 2, wherein the stochastic gradient algorithm processor is configured to determine a slope of a waveform at a symbol center of the synchronization signal.

4. The communication receiver of claim 1, wherein the synchronization correlator is configured to determine a deviation error of a synchronization signal and output the deviation error signal.

5. The communication receiver of claim 1, wherein the synchronization correlator is configured to determine a frequency error of a synchronization signal and output the frequency error signal.

* * * * *